Aug. 9, 1938.    J. SCHEMBRI    2,126,046
BEARING
Filed June 7, 1937
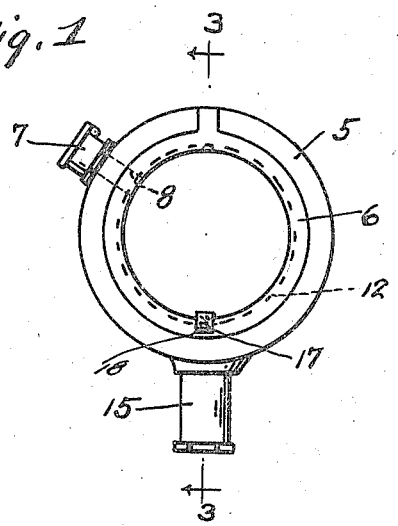
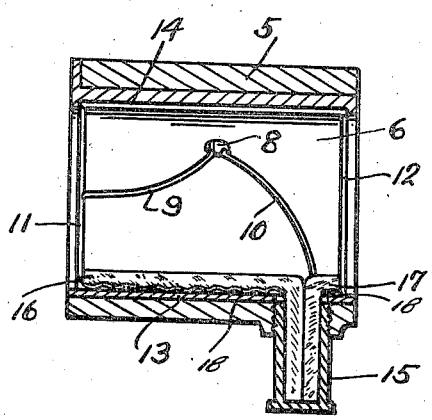
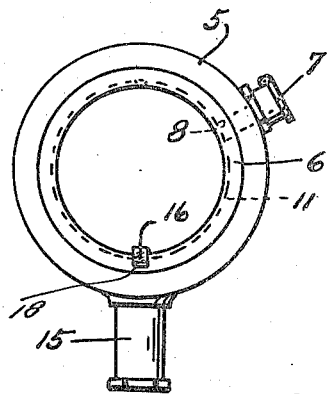
Inventor
J. Schembri
By Clarence A. O'Brien
Hyman Berman
Attorneys Patented Aug. 9, 1938

2,126,046

UNITED STATES PATENT OFFICE 2,126,046

BEARING

James Schembri, Ithaca, N. Y.

Application June 7, 1937, Serial No. 146,954

2 Claims. (Cl. 308—132)

This invention relates to bearings, and more particularly to shaft bearings.

The present invention is concerned especially with the lubricating of a bearing and has as its object the provision of a bearing so equipped for the lubrication thereof as to permit of the use of a bearing that may be of from one-third to one-fourth the length usually required in a conventional bearing used for the same purpose; and the invention, together with its objects and advantages will be best understood from a study of the following description taken in connection with the accompanying drawing, wherein:

Figure 1 is an elevational view of one end of the bearing.

Figure 2 is a similar view of the opposite end of the bearing.

Figure 3 is a longitudinal sectional view taken substantially on the line 3—3 of Figure 1.

Referring to the drawing by reference numerals it will be seen that the bearing, in accordance with the present invention comprises a tubular body 5 of any suitable length, and the same, in accordance with the present invention is provided with a bushing 6 which can be made of babbitt, bronze or cast iron or semi-steel, due to the provision for lubricating the bearing as contemplated by the present invention.

Further, in accordance with the present invention, the bearing body 5 is tapped by an oil cup or lubricant fitting 7, and in line with the outlet of the oil cup 7 the bushing 6 is provided with an oil hole 8.

Leading from the oil hole 8, and in different directions relative to one another, are oil grooves 9 and 10 respectively.

Groove 9 extends from the hole 8 toward one end of the bushing 6 to communicate with an internal circular oil groove 11 provided at said end of the bushing 6.

The bushing 6 is also provided adjacent its opposite end with a circular oil groove 12; and these grooves 11, 12, extend from opposite sides of a longitudinal groove 13 to the opposite side of a shallower longitudinal oil groove 14 formed in the bushing 6 diametrically opposite to the deeper groove 13.

Tapped into the bearing body 5 adjacent one end of the groove 13 is an oil sump-cylinder 15 which is closed at its outer end and accommodates one end of wicks 16, 17, that fit snugly within the groove 13 and extend in reverse directions relative to one another towards opposite ends of the bushing 6.

It will thus be seen that by such an arrangement of oil cup 7, grooves, wicks, and oil sump, the bearing will be maintained in a well-lubricated condition, it being apparent that the oil put in the oil cup 7 will flow through the grooves 8 and 9, and the grooves 11, 12 and 14, finally reaching the wicks 16 and 17, the surplus oil going to the sump 15, and the wicks 16, 17, at the same time, serving, by capillary action, to draw the oil from the oil sump 15 for applying the oil or lubricant to the shaft journalled in the bearing as the shaft is turned. Thus a positive oiling of the shaft and bearing will result and recourse to chain, ring, or force-feed oiling is obviated.

Further, by so equipping the bearing as taught by this invention, the bearing and shaft can be lubricated very economically, there being little if any oil waste, as the oil is fed to the shaft only as it turns and as it requires lubrication.

It is also apparent that both barrel type and split bearings can be provided for lubricating purposes in a manner taught by this invention.

If desirable, and as illustrated, suitable springs 18—18 may be located in the groove 13 beneath the felt strips 16—17 for yieldably maintaining these felt strips against the shaft journaled in the bearing.

It will be further understood that where a longer bearing is employed, instead of but a single oil sump 15 two or more sumps may be used if found desirable.

It is also to be further understood that if desired the sump cylinders 15 may be made of glass or other transparent material for the purpose of visibility.

Having thus described the invention, what is claimed as new is:

1. A bearing of the type described comprising a tubular body and an inner bushing that is held in radial compression in said body and provides a bearing surface, said inner bushing being provided internally with circumferential oil grooves at the respective opposite ends thereof and longitudinal oil grooves at diametrically opposite sides of the bushing and connecting said circumferential oil grooves, one of said longitudinal grooves being relatively wide and deep, a wick in the last mentioned longitudinal groove, an oil cup tapped into the body of said bearing, said bushing being provided with an opening in line with said oil cup and also being provided with internal grooves extending in different directions from said opening, one of said last named grooves extending to one of the internal peripheral grooves and the other of the last named groove extending to the last named wick-accommodating longitudinal groove, a sump-tube tapped into the body of the bearing adjacent one end of the wick accommodating longitudinal groove, and the wick in said wick-accommodating longitudinal groove having an end extending into said sump-tube.

2. In a bearing, a bushing provided internally thereof and at the respective opposite ends thereof with circumferential oil grooves, said bushing being also provided at diametrically opposite sides thereof with longitudinal oil grooves connecting said circumferential oil grooves, one of said longitudinal grooves being relatively wide and deep, and a wick in the last mentioned longitudinal groove; said bushing being also provided with an oil inlet opening and internal grooves extending in different directions from said opening, one of the last named grooves extending to one of the peripheral grooves, and the other of the last named grooves extending to the wick-accommodating longitudinal groove.

JAMES SCHEMBRI.